United States Patent
Iwai et al.

(10) Patent No.: US 11,785,505 B2
(45) Date of Patent: Oct. 10, 2023

(54) APPARATUS AND METHOD FOR BACKGROUND DATA TRANSFER

(71) Applicant: NEC CORPORATION, Tokyo (JP)

(72) Inventors: Takanori Iwai, Tokyo (JP); Toshiyuki Tamura, Tokyo (JP)

(73) Assignee: NEC CORPORATION, Tokyo (JP)

(*) Notice: Subject to any disclaimer, the term of this patent is extended or adjusted under 35 U.S.C. 154(b) by 320 days.

(21) Appl. No.: 16/494,432

(22) PCT Filed: Dec. 14, 2017

(86) PCT No.: PCT/JP2017/044838
§ 371 (c)(1),
(2) Date: Sep. 16, 2019

(87) PCT Pub. No.: WO2018/168132
PCT Pub. Date: Sep. 20, 2018

(65) Prior Publication Data
US 2020/0022027 A1    Jan. 16, 2020

(30) Foreign Application Priority Data
Mar. 17, 2017   (JP) ................. 2017-052866

(51) Int. Cl.
*H04W 28/18*    (2009.01)
*H04L 12/14*    (2006.01)

(52) U.S. Cl.
CPC ......... *H04W 28/18* (2013.01); *H04L 12/1407* (2013.01)

(58) Field of Classification Search
CPC .... H04W 28/18; H04W 4/24; H04L 12/1407; H04L 12/14; H04M 15/41; H04M 15/42;
(Continued)

(56) References Cited

U.S. PATENT DOCUMENTS

| | | | | |
|---|---|---|---|---|
| 2003/0232614 | A1* | 12/2003 | Squibbs | H04M 15/8016 455/405 |
| 2018/0054799 | A1* | 2/2018 | Starsinic | H04W 52/0216 |
| 2019/0124671 | A1* | 4/2019 | Starsinic | H04W 72/1205 |

FOREIGN PATENT DOCUMENTS

| | | |
|---|---|---|
| JP | 2013-511871 A | 4/2013 |
| WO | 2016/172521 A1 | 10/2016 |

OTHER PUBLICATIONS

OneM2M, Published in Aug. 30, 2016, oneM2M Techinical report, pp. 50.*

(Continued)

*Primary Examiner* — Kwang B Yao
*Assistant Examiner* — Syed M Bokhari
(74) *Attorney, Agent, or Firm* — Sughrue Mion, PLLC

(57) ABSTRACT

An exposure node (50) receives a first request for resource management for future background data transfer between an application service provider and a plurality of radio terminals (10) from a server (60) associated with the application service provider and send a second request to a policy control node (40) in response to receiving the first request. The first request includes a parameter indicating whether background data transfer not complying with a previously agreed or negotiated transfer policy should be stopped, or whether the background data transfer should continue under a charging rule different from a previously agreed charging rule. The second request includes the parameter obtained from the first request. This enables the application service provider to negotiate with the radio communication network about handling of background data transfer not complying with a previously agreed transfer policy.

15 Claims, 11 Drawing Sheets

(58) Field of Classification Search
CPC .. H04M 15/51; H04M 15/50; H04M 15/8083; H04M 15/66; H04M 3/00; H04M 15/00
USPC .......................................................... 370/310
See application file for complete search history.

(56) References Cited

OTHER PUBLICATIONS

3GPP TS 22.101 V14.5.0, 3rd Generation Partnership Project; Technical Specification Group Services and System Aspects; Service aspects; Service principles (release 14), Dec. 2016, pp. 1-99.
3GPP TS 23.682 V14.2.0, 3rd Generation Partnership Project; Technical Specification Group Services and System Aspects; Architecture enhancements to facilitate communications with packet data networks and applications (release 14), Dec. 2016, pp. 1-104.
3GPP TS 23.203 V14.2.0, 3rd Generation Partnership Project; Technical Specification Group Services and System Aspects; Policy and charging control architecture (release 14), Dec. 2016, pp. 1-256.
"Enhancement of the service exposure for background data transfer", NTT DOCOMO, et al., 3GPP TSG-SA WG1 #77, S1-171415, Jeju Island, South Korea, Feb. 13-17, 2017, pp. 1-4.
3GPP TS 23.682 V15.0.0, 3rd Generation Partnership Project; Technical Specification Group Services and System Aspects; Architecture enhancements to facilitate communications with packet data networks and applications (release 15), Mar. 2017, pp. 1-108.
International Search Report for PCT/JP2017/044838 dated Mar. 6, 2018 [PCT/ISA/210].
Japanese Office Action for JP Application No. 2019-505712 dated Aug. 2, 2022 with English Translation.

* cited by examiner

APPARATUS AND METHOD FOR BACKGROUND DATA TRANSFER

CROSS REFERENCE TO RELATED APPLICATIONS

This application is a National Stage of International Application No. PCT/JP2017/044838, filed on Dec. 14, 2017, which claims priority from Japanese Patent Application No. 2017-052866, filed on Mar. 17, 2017, the contents of all of which are incorporated herein by reference in their entirety.

TECHNICAL FIELD

The present disclosure relates to a radio communication network and, in particular, to background data transfer provided by a radio communication network to a radio terminal based on a request from an application service provider.

BACKGROUND ART

The Third Generation Partnership Project (3GPP) has standardized background data transfer (see, for example, Non Patent Literature 1 to 3). Typically, the background data transfer means a data transfer service for a radio terminal (User Equipment (UE)) under a special charging policy (i.e., lower charging rate) performed in a time window recommended by a 3GPP network.

The 3GPP network enables an Application Service Provider (ASP) to negotiate with the 3GPP network about a transfer policy to be applied to the background data transfer, and to request the 3GPP network to provide sponsored connectivity for the background data transfer for a UE in accordance with the agreed transfer policy. The transfer policy includes a time window recommended for the background data transfer, a reference to a charging rate for this time window, and optionally a maximum aggregated bitrate. The maximum aggregated bitrate indicates that the charging according to the referenced charging rate is only applicable for the aggregated traffic of all involved UEs that stays below this value. The maximum aggregated bitrate (optionally provided in the transfer policy) is not enforced in the 3GPP network. The mobile operator may apply offline Charging Data Records (CDRs) processing to determine whether the maximum aggregated bitrate for the set of UEs was exceeded by the ASP and charge the excess traffic differently.

Non Patent Literature 1 in clause 29.2 specifies the services and capabilities exposed by the 3GPP core network. More specifically, Non Patent Literature 1 in clause 29.2 specifies that the 3GPP core network provides interaction with a third party for 3GPP resource management for background data transfer. Non Patent Literature 2 in clauses 4.5.9 and 5.9 specifies details and procedures of resource management of background data transfer. Non Patent Literature 3 in clause 5.2.13 specifies the Nt interface (or reference point) between the Service Capability Exposure Function (SCEF) and the Policy and Charging Rules Function (PCRF). The Nt interface enables negotiation between the SCEF and the PCRF about a recommended time window(s) and related conditions for future background data transfer. Non Patent Literature 3 in clauses 6.1.16 and 7.11.1 specifies details of the negotiation for future background data transfer via the Nt interface.

Non Patent Literature 4 proposes a revision of clause 29.2 of Non Patent Literature 1 (3GPP TS 22.101). More specifically, Non Patent Literature 4 describes that when the background data transfer (a) exceeds the agreed maximum data volume, or (b) continues beyond the agreed time window, or (c) happens outside the agreed areas, the third party Application Server (AS) shall be able to indicate to the 3GPP System (or 3GPP network) whether this background data transfer shall be stopped by the 3GPP System or shall continue possibly under a different charging regime (or charging rule).

CITATION LIST

Non Patent Literature

Non Patent Literature 1: 3GPP TS 22.101 V14.5.0 (2016-12) "3rd Generation Partnership Project; Technical Specification Group Services and System Aspects; Service aspects; Service principles (Release 14)", December 2016

Non Patent Literature 2: 3GPP TS 23.682 V14.2.0 (2016-12) "3rd Generation Partnership Project; Technical Specification Group Services and System Aspects; Architecture enhancements to facilitate communications with packet data networks and applications (Release 14)", December 2016

Non Patent Literature 3: 3GPP TS 23.203 V14.2.0 (2016-12) "3rd Generation Partnership Project; Technical Specification Group Services and System Aspects; Policy and charging control architecture (Release 14)", December 2016

Non Patent Literature 4: 3GPP S1-171415, NTT DOCOMO, KPN, KDDI, TOYOTA ITC, DENSO CORPORATION, NEC, "Enhancement of the service exposure for background data transfer", 3GPP TSG-SA WG1 Meeting #77, Jeju Island, South Korea, 13-17 Feb. 2017

SUMMARY OF INVENTION

Technical Problem

Non Patent Literature 4 proposes only the change in the service principles regarding background data transfer between the 3GPP network and the application service provider (or the application server thereof). It is, however, not clear how to implement this change in the 3GPP network.

One of the objects to be attained by embodiments disclosed herein is to provide an apparatus, a method, and a program that enable an application service provider (or an application server thereof) to negotiate with a radio communication network (e.g., 3GPP network) about handling of background data transfer in the radio communication network when the background data transfer does not comply with a previously agreed transfer policy. Note that this object is only one of the objects to be attained by the embodiments disclosed herein. Other objects or problems and novel features will be made apparent from the description and the accompanying drawings.

Solution to Problem

In a first aspect, an exposure node located in a radio communication network includes at least one memory and at least one processor coupled to the at least one memory. The at least one processor is configured to receive, from a server associated with an application service provider, a first request for resource management for future background data transfer between the application service provider and a plurality of radio terminals. The first request includes a parameter indicating whether the background data transfer should be stopped, or whether the background data transfer should continue under a charging rule different from a previously agreed charging rule, when the background data transfer does not comply with a previously agreed or negotiated transfer policy. The at least one processor is configured to, in response to receiving the first request, send to a policy control node within the radio communication network a second request for the resource management for the background data transfer. The second request includes the parameter obtained from the first request. The at least one processor is configured to send to the server a transfer policy determined by the policy control node based on the second request to be applied to the background data transfer.

In a second aspect, a policy control node located in a radio communication network includes at least one memory and at least one processor coupled to the at least one memory. The at least one processor is configured to receive from a server associated with an application service provider, via an exposure node, a request for resource management for future background data transfer between the application service provider and a plurality of radio terminals. The request includes a parameter indicating whether the background data transfer should be stopped, or whether the background data transfer should continue under a charging rule different from a previously agreed charging rule, when the background data transfer does not comply with a previously agreed or negotiated transfer policy. The at least one processor is configured to determine a transfer policy based on the request and send the determined transfer policy to the server via the exposure node.

In a third aspect, a network node located in a radio communication network includes at least one memory and at least one processor coupled to the at least one memory. The at least one processor is configured to receive, from a policy control node, a policy rule to be applied to a packet flow associated with background data transfer between an application service provider and a radio terminal. The at least one processor is configured to enforce the policy rule. The policy rule indicates whether the background data transfer should be stopped, or whether the background data transfer should continue under a charging rule different from a previously agreed charging rule, when the background data transfer does not comply with a transfer policy previously agreed or negotiated between the application service provider and the radio communication network.

In a fourth aspect, a base station located in a radio access network includes at least one memory and at least one processor coupled to the at least one memory. The at least one processor is configured to receive, from a core network, a policy rule to be applied to a packet flow associated with background data transfer between an application service provider and a radio terminal or applied to a bearer for transferring the packet flow. The at least one processor is configured to enforce the policy rule. The policy rule indicates whether the background data transfer should be stopped when the background data transfer does not comply with a transfer policy previously agreed or negotiated between the application service provider and the core network.

In a fifth aspect, a radio terminal includes at least one memory and at least one processor coupled to the at least one memory. The at least one processor is configured to receive, from a core network via a base station, a policy rule to be applied to a packet flow associated with background data transfer between an application service provider and the radio terminal or applied to a bearer for transferring the packet flow. The at least one processor is configured to enforce the policy rule. The policy rule indicates whether the background data transfer should be stopped when the background data transfer does not comply with a transfer policy previously agreed or negotiated between the application service provider and the core network.

In a sixth aspect, a method for an exposure node located in a radio communication network includes: (a) receiving, from a server associated with an application service provider, a first request for resource management for future background data transfer between the application service provider and a plurality of radio terminals; (b) in response to receiving the first request, sending to a policy control node within the radio communication network a second request for the resource management for the background data transfer; and (c) sending to the server a transfer policy determined by the policy control node based on the second request to be applied to the background data transfer. The first request includes a parameter indicating whether the background data transfer should be stopped, or whether the background data transfer should continue under a charging rule different from a previously agreed charging rule, when the background data transfer does not comply with a previously agreed or negotiated transfer policy. The second request includes the parameter obtained from the first request.

In a seventh aspect, a method for a policy control node located in a radio communication network includes: (a) receiving from a server associated with an application service provider, via an exposure node, a request for resource management for future background data transfer between the application service provider and a plurality of radio terminals; and (b) determining a transfer policy based on the request and sending the determined transfer policy to the server via the exposure node. The request includes a parameter indicating whether the background data transfer should be stopped, or whether the background data transfer should continue under a charging rule different from a previously agreed charging rule, when the background data transfer does not comply with a previously agreed or negotiated transfer policy.

In an eighth aspect, a method for a network node located in a radio communication network includes: (a) receiving, from a policy control node, a policy rule to be applied to a packet flow associated with background data transfer between an application service provider and a radio terminal; and (b) enforcing the policy rule. The policy rule indicates whether the background data transfer should be stopped, or whether the background data transfer should continue under a charging rule different from a previously agreed charging rule, when the background data transfer does not comply with a transfer policy previously agreed or negotiated between the application service provider and the radio communication network.

In a ninth aspect, a method for a base station located in a radio access network includes: (a) receiving, from a core network, a policy rule to be applied to a packet flow associated with background data transfer between an application service provider and a radio terminal or applied to a bearer for transferring the packet flow; and (b) enforcing the policy rule. The policy rule indicates whether the background data transfer should be stopped when the background data transfer does not comply with a transfer policy previously agreed or negotiated between the application service provider and the core network.

In a tenth aspect, a method for a radio terminal includes: (a) receiving, from a core network via a base station, a policy rule to be applied to a packet flow associated with background data transfer between an application service provider and the radio terminal or applied to a bearer for transferring the packet flow; and (b) enforcing the policy rule. The policy rule indicates whether the background data transfer should be stopped when the background data transfer does not comply with a transfer policy previously agreed or negotiated between the application service provider and the core network.

In an eleventh aspect, a program includes instructions (software codes) that, when loaded into a computer, cause the computer to perform the method according to one of the above-described sixth to tenth aspects.

Advantageous Effects of Invention

The above aspects can provide an apparatus, a method, and a program that enable an application service provider (or an application server thereof) to negotiate with a radio communication network (e.g., 3GPP network) about handling of background data transfer in the radio communication network when the background data transfer does not comply with a previously agreed transfer policy.

DESCRIPTION OF EMBODIMENTS

Hereinafter, specific embodiments will be described in detail with reference to the drawings. The same or corresponding elements are denoted by the same symbols throughout the drawings, and duplicated explanations are omitted as necessary for the sake of clarity.

The embodiments to be described below mainly focus on background data transfer specified in 3GPP Release 13 and beyond (i.e., LTE-Advanced Pro). However, these embodiments are not limited to an LTE-Advanced Pro network and may be applied to other mobile communication networks or systems such as 3rd Generation Partnership Project (3GPP) Universal Mobile Telecommunications System (UMTS), 3GPP2 CDMA2000 system, Global System for Mobile communications (GSM (registered trademark))/General packet radio service (GPRS) system, WiMAX system, and mobile WiMAX system. These embodiments may be applied to a 5th generation mobile communication system (5G) which is under standardization by the 3GPP. 5G is expected to be realized by LTE-Advanced Pro and innovative enhancement/evolution by the introduction of a new 5G air interface (i.e., new Radio Access Technology (RAT)). The new RAT supports, for example, frequency bands higher than the frequency bands (e.g., 6 GHz or lower) supported by LTE-Advanced Pro. For example, the new RAT supports centimeter-wave bands (10 GHz or higher) and millimeter-wave bands (30 GHz or higher).

First Embodiment

Figure 1:
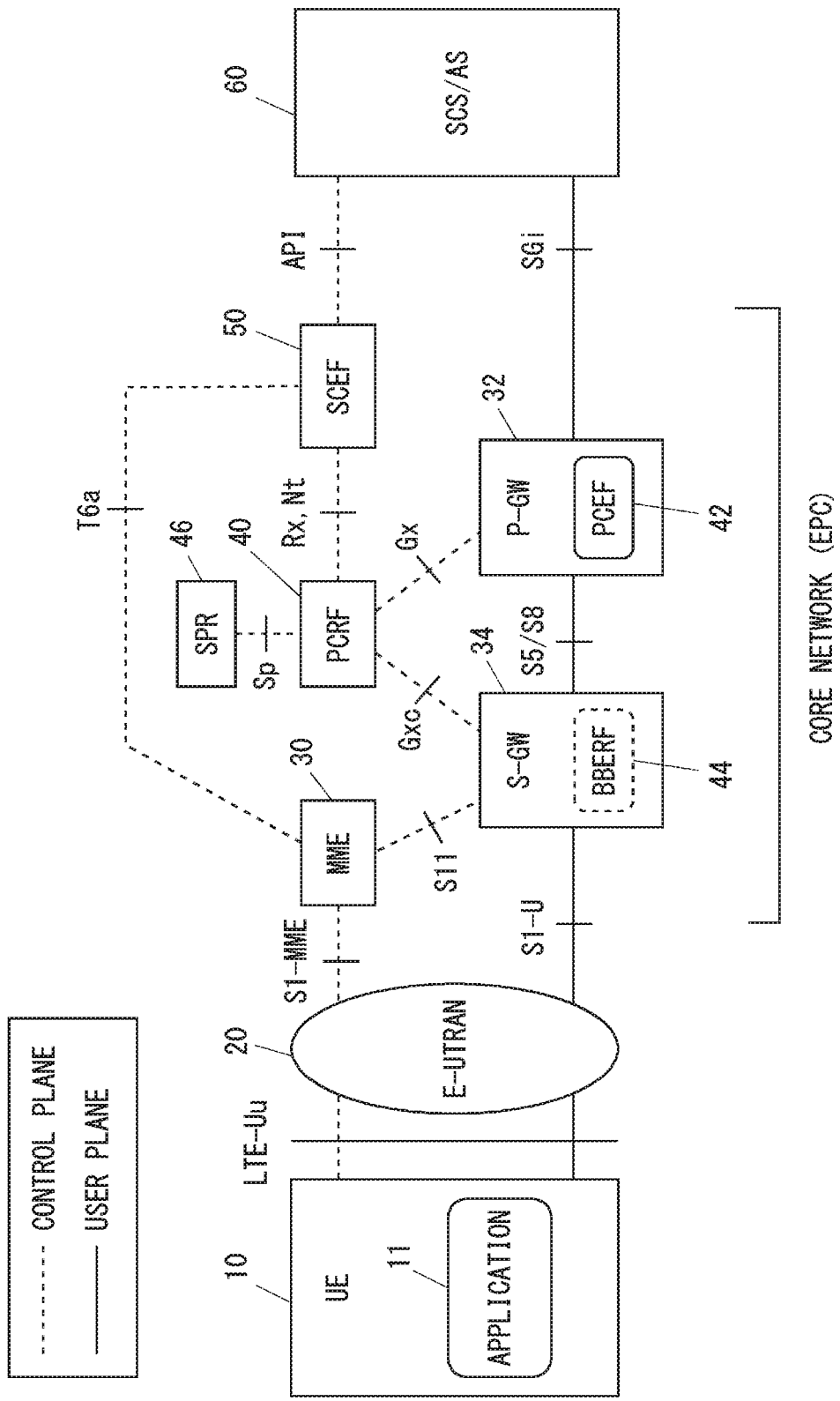
FIG. 1 is a diagram showing a configuration example of a radio communication network according to embodiments.

FIG. 1 shows a configuration example of a radio communication network according to a plurality of embodiments including this embodiment. FIG. 1 shows a network configuration related to background data transfer in LTE-Advanced Pro. A UE 10 establishes a signaling connection with a Mobility Management Entity (MME) 30 via a radio access network (i.e., Evolved UMTS Terrestrial Radio Access Network (E-UTRAN) 20), and performs user plane communication with a Service Capability Server (SCS)/Application Server (AS) 60 via an E-UTRAN 20 and via a Packet Data Network Gateway (P-GW) 32 and an S-GW 34 within a core network (i.e., Evolved Packet Core (EPC)).

The SCS/AS 60 is a server associated with an application service provider (ASP). The SCS/AS 60 communicates with one or more applications 11 hosted on the UE 10 via a Public Land Mobile Network (PLMN) (i.e., 3GPP network in this case). The SCS/AS 60 may be an AS, or may be an SCS and an AS. The SCS connects the AS to the 3GPP network and allows the AS to communicate with the UE 10 through services defined by the 3GPP. The SCS also allows the AS to communicate with a PCRF via an SCEF 50. An SCS 2 is controlled by a GPP network operator or an ASP. The SCS is also referred to as a Machine type Communication (MTC) server or a Machine-to-Machine (M2M) server. The SCS may be a single independent physical entity or may be a functional entity added to another network element (e.g., SCEF 50 or AS). The MTC server is connected to a Packet Switched (PS) network and communicates with MTC devices. The MTC devices may constitute an MTC Group per MTC User.

The SCEF 50 is an entity in the 3GPP network and provides means to securely expose services and capabilities provided by 3GPP network interfaces. The SCEF 50 provides access to network capabilities through network application programming interfaces (e.g., Network APIs) defined by the Open Mobile Alliance (OMA), the Global System for Mobile Communications Association (GSMA), or possibly other standardization bodies. The SCEF 50 abstracts the services from the underlying 3GPP network interfaces and protocols.

A PCRF 40, a Policy and Charging Enforcement Function (PCEF) 42, a Bearer Binding and Event Reporting Function (BBERF) 44, and a Subscription Profile Repository (SPR) 46 are elements (or logical entities) related to the Policy and charging control (PCC) architecture. The PCRF 40 determines a PCC rule to be applied to a service data flow of the UE 10, and sends the determined PCC rule to the PCEF 42 located in the P-GW 32. The PCC rule includes a service data flow (SDF) template for detecting the service data flow of the UE 10, and parameters (e.g., Quality of Service (QoS) policy and charging rule) for policy control and charging control on the service data flow. The service data flow is an aggregated set of packet flows transferred through the PCEF 42. In the example of FIG. 1, an SDF template includes one or more SDF filters for identifying a service data flow(s) associated with an IP Connectivity Access Network (IP-CAN) session between the UE 10 and the SCS/AS 60.

The PCRF 40 has a signaling interface (i.e., Gx interface (or reference point)) with the PCEF 42 located in the P-GW 32. The PCRF 40 may have a signaling interface (i.e., Gxc interface (or reference point)) with the BBERF 44 located in the S-GW 34.

The PCRF 40 also has a signaling interface (i.e., Nt and Rx interfaces (or reference points)) with the SCEF 50. The Nt interface enables the SCEF 50 and the PCRF 40 to negotiate a recommended time windows(s) and related conditions for future background data transfer. The Rx interface enables transport of application level session information (i.e., Application Function (AF) session information) an Application Function (AF) to the PCRF 40. When staring the Rx procedure, the SCEF 40 acts as an AF. In the case of background data transfer, the AF session information includes a reference ID indicating the transfer policy that the SCS/AS 60 has previously negotiated with the PCRF 40 (or another PCRF) via the SCEF 50. Further, the AF session information for background data transfer may include information for sponsored data connectivity (e.g., ASP identifier).

Furthermore, the PCRF 40 has a signaling interface (i.e., Sp interface (or reference point)) with the SPR 46. The SPR 46 is a logical entity that contains all subscriber/subscription related information needed for subscription-based policies and IP-CAN bearer level PCC rules. The SPRs 46 may be combined with or distributed across other databases in the operator's network.

Moreover, the SPR 46 may provide sponsored data connectivity profile information. The sponsored data connectivity profile information includes a list of application service providers and their applications per sponsor identity. The sponsored data connectivity profile information may be configured by the PCRF 40.

Further, the SPR 46 may provide policy information related to an ASP. The policy information includes an ASP identifier and a transfer policy and its reference ID. The policy information related to an ASP is available in the SPR 46 only after it is stored by the PCRF 40.

Figure 2:
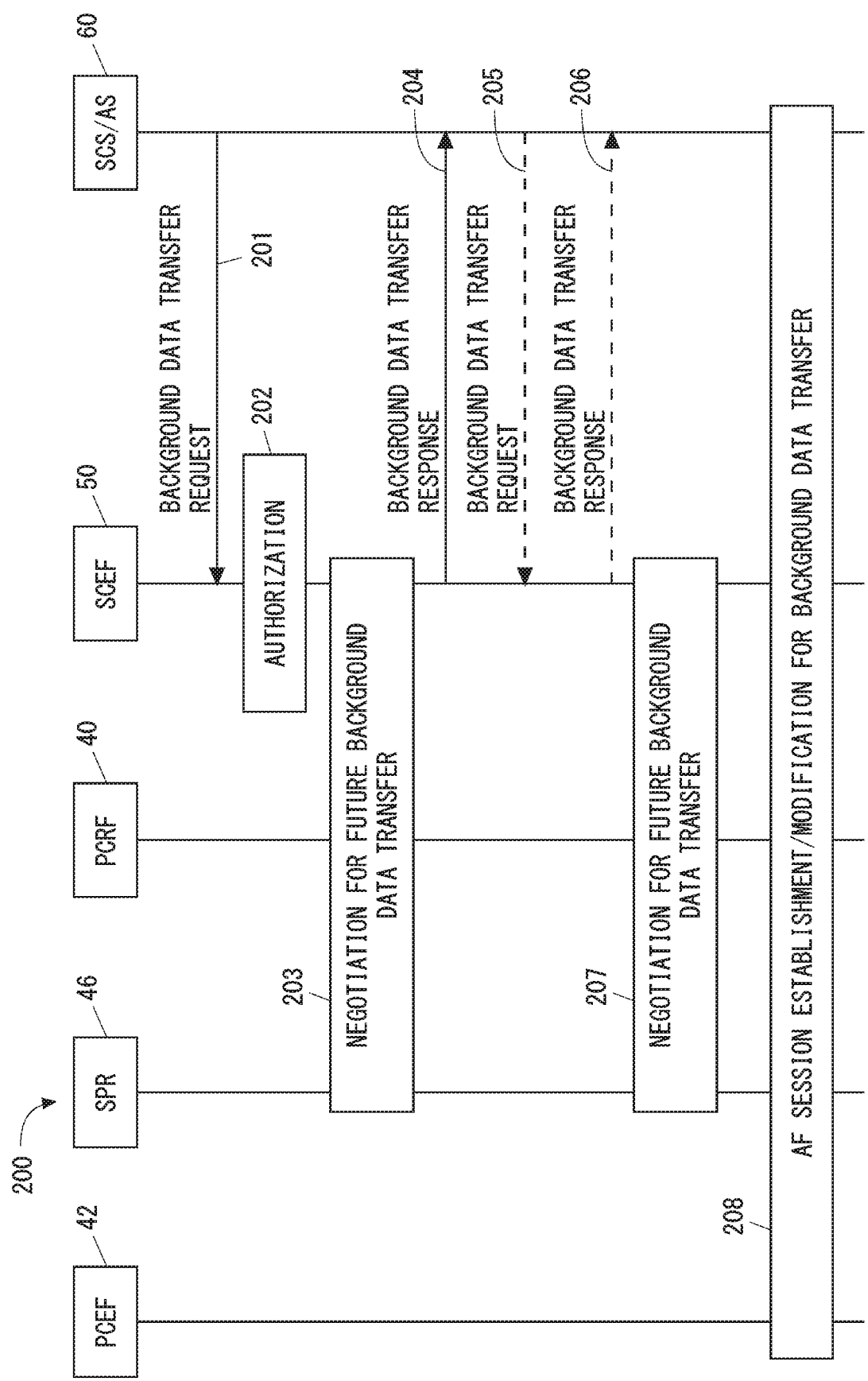
FIG. 2 is a sequence diagram showing an example of a procedure of negotiation for future background data transfer and execution of the background data transfer according to embodiment.

FIG. 2 shows a process 200 that is an example of an outline procedure of the negotiation and execution of the background data transfer according to a plurality of embodiments including this embodiment. The outline procedure shown in FIG. 2 is similar to the procedure defined in clause 5.9 of Non Patent Literature 2. Steps 201 to 207 are performed to negotiate future background data transfer for a set of UEs. The set of UEs may be one or more MTC devices belonging to an MTC Group.

In Step 201, the SCS/AS 60 sends a Background data transfer request message to the SCEF 50. This request includes SCS/AS Identifier, SCS/AS Reference ID, Volume per UE, Number of UEs, and Desired time window. The SCS/AS Identifier can also be referred to as an ASP identifier. The Volume per UE describes the volume of data the SCS/AS expects to be transferred per UE. The Number of UEs describes the expected amount of UEs participating in the data transfer. The Desired time window describes the time interval during which the SCS/AS wants to realize the data transfer. The background data transfer request may optionally include geographic area information. The background data transfer request may include one or both of a maximum data transfer rate (i.e., rate quota) per UE (or per SDF) and a maximum amount of data bytes (i.e., byte quota) per UE (or per SDF).

In Step 202, the SCEF 50 authenticates the received SCS/AS request (i.e., background data transfer request). In Step 203, the SCEF 50 selects one of the available PCRFs and triggers the Negotiation for future background data transfer procedure with the selected PCRF (i.e., PCRF 40 in this case). The SCEF 50 forwards parameters provided by the SCS/AS 60 to the PCRF 40. The PCRF 40 responds to the SCEF 50 with one or more possible transfer policies and a reference ID.

In Step 204, the SCEF 50 forwards the received reference ID and transfer policies to the SCS/AS 60 by sending a Background data transfer response message. This Background data transfer response message includes the SCS/AS Reference ID, the reference ID, and the possible transfer policies. The SCS/AS 60 stores the received reference ID for future interaction with the PCRF 40.

If more than one transfer policies are received, the SCS/AS 60 selects one of them and sends another Background data transfer request message to the SCEF 50 to inform the SCEF 50 and PCRF 40 about the selected transfer policy (Step 205). This background data transfer request message includes the SCS/AS Identifier, the SCS/AS Reference ID, and the selected transfer policy.

In Step 206, the SCEF 50 confirms the transfer policy selection by sending a Background data transfer response message to the SCS/AS 60. This Background data transfer response message includes the SCS/AS Reference ID.

In Step 207, the PCRF 40 and the SCEF 50 continue the Negotiation for future background data transfer procedure with the PCRF 40. When Steps 205 and 206 have been performed, the SCEF 50 sends the transfer policy selected by the SCS/AS 60 to the PCRF 40. The PCRF 40 stores the reference ID and the associated new transfer policy in the SPR 46.

Step 208 is the execution phase of background data transfer for an individual UE. The SCS/AS 60 (acting as an AF) provides the reference ID to the PCRF 40 together with service information (or SCS/AS session information or AF session information). The service information includes an IP address(es) of an IP flow(s), port numbers to be used, and so forth. Typically, the SCS/AS 60 may request sponsored (data) connectivity for the background data transfer for individual UEs. The SCS/AS 60 may contact the PCRF 40 directly or via the SCEF 50 acting as an AF.

In Step 208, the PCRF 40 retrieves the corresponding transfer policy from the SRP 46 based on the reference ID received from the SCS/AS 60 (acting as an AF) or the SCEF 50 (acting as an AF). The PCRF 40 identifies an IP-CAN session(s) affected by this transfer policy and triggers an IP-CAN Session Modification procedure. This IP-CAN Session Modification procedure causes (new) activation (i.e., Dedicated Bearer Activation Procedure) of a dedicated bearer, or modification (i.e., Bearer Modification Procedure) of an existing dedicated bearer, for the sponsored (data) connectivity for the background data transfer.

Figure 3:
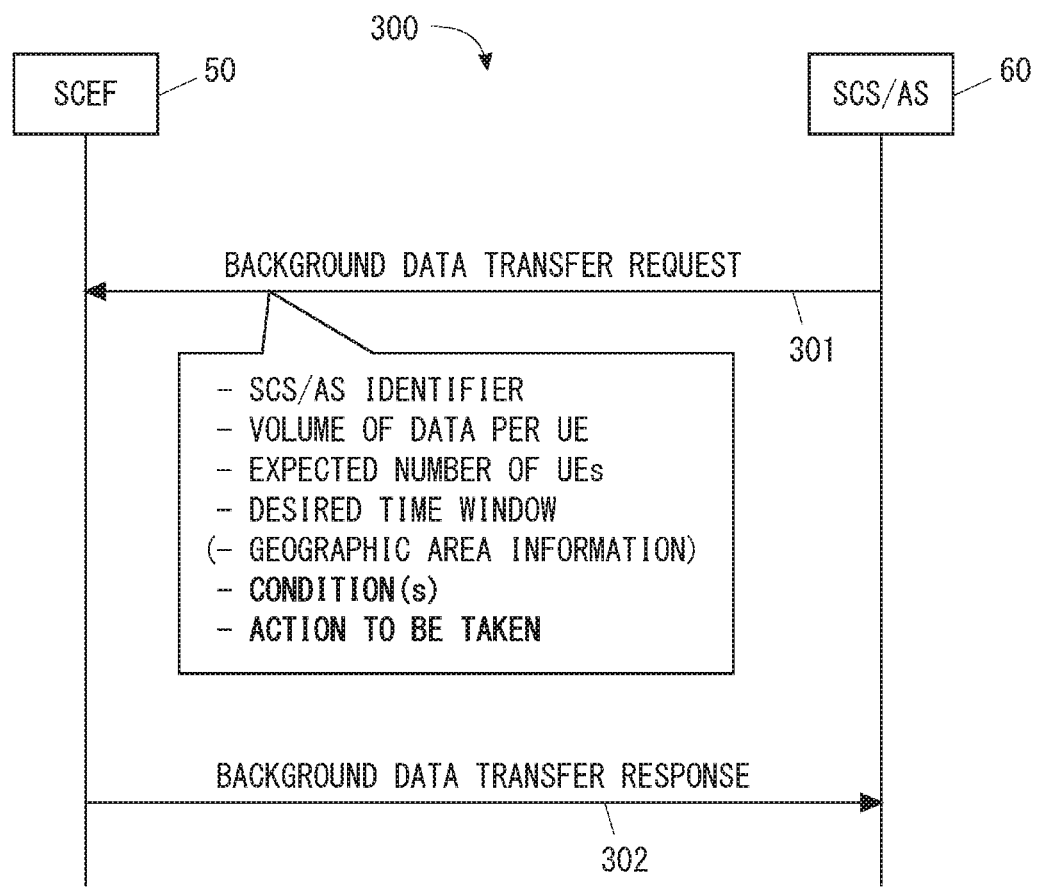
FIG. 3 is a sequence diagram showing an example of interaction between SCS/AS and SCEF for negotiation for future background data transfer.

The following describes an improvement to the negotiation and execution procedures for the background data transfer according to a first embodiment. FIG. 3 shows a process 300 that is an example of interaction between the SCS/AS 60 and the SCEF 50 for the negotiation for future background data transfer. In Step 301, the SCS/AS 60 sends to the SCEF 50 an improved Background data transfer request message that contains one or more new parameters. As already described, the Background data transfer request message requests resource management for future background data transfer between an ASP and a set of UEs via the 3GPP network.

The new parameter(s) contained in the Background data transfer request message of Step 301 indicates whether background data transfer should be stopped, or whether the background data transfer should continue under a charging rule different from the previously agreed charging rule, when the background data transfer does not comply with a previously agreed or negotiated transfer policy. This different charging rule may define, for example, a charging rate higher than that of the previously agreed charging rule.

In one example, the previously agreed transfer policy may include a previously agreed maximum data volume. In this case, the above-described new parameter(s) may indicate whether the background data transfer should be stopped, or whether the background data transfer should continue under the charging rule different from the previously agreed charging rule, when the background data transfer exceeds the previously agreed maximum data volume. The previously agreed maximum data volume may be a maximum data volume per UE. Alternatively, the previously agreed maximum data volume may be a maximum data volume of a set of UEs. Further, the transfer policy may include one or both of a maximum data transfer rate (i.e., rate quota) per UE (or per SDF) and a maximum amount of data bytes (i.e., byte quota) per UE (or per SDF).

In one example, the previously agreed transfer policy may include a previously agreed time window. In this case, the above-described new parameter(s) may indicate whether the background data transfer should be stopped, or whether the background data transfer should continue under the different charging rule, when the background data transfer continues beyond the previously agreed time window.

In one example, the previously agreed transfer policy may include a previously agreed geographic area(s). In this case, the above-described new parameter(s) may indicate whether the background data transfer should be stopped, or whether the background data transfer should continue under the different charging rule, when the background data transfer happens outside the previously agreed (geographic) area(s).

Additionally or alternatively, the new parameter(s) contained in the background data transfer request message may indicate a priority of the set of UEs that will perform future background data transfer.

As shown in FIG. 3, the new parameter(s) contained in the background data transfer request message of Step 301 may indicate one or more conditions representing an activity not complying with the previously agreed transfer policy and an action to be taken when each condition is met. As described above, the one or more conditions may be that the background data transfer (a) exceeds the previously agreed maximum data volume, (b) continues beyond the previously agreed time window, or (c) happens outside the previously agreed (geographic) area. The action to be taken when each condition is met may be stopping the data transfer or continuing the data transfer under the different charging rule.

As described with reference to FIG. 2, in response to receiving the background data transfer request, the SCEF 50 triggers the Negotiation for future background data transfer procedure with the PCRF 40. The SCEF 50 receives one or more possible transfer policies and a reference ID from the PCRF 40. In Step 302, the SCEF 50 forwards the received reference ID and transfer policies to the SCS/AS 60 by sending a Background data transfer response message. The Background data transfer response message may include locally available information (e.g., congestion level) regarding the geographic area(s) requested by the SCS/AS 60.

Figure 4:
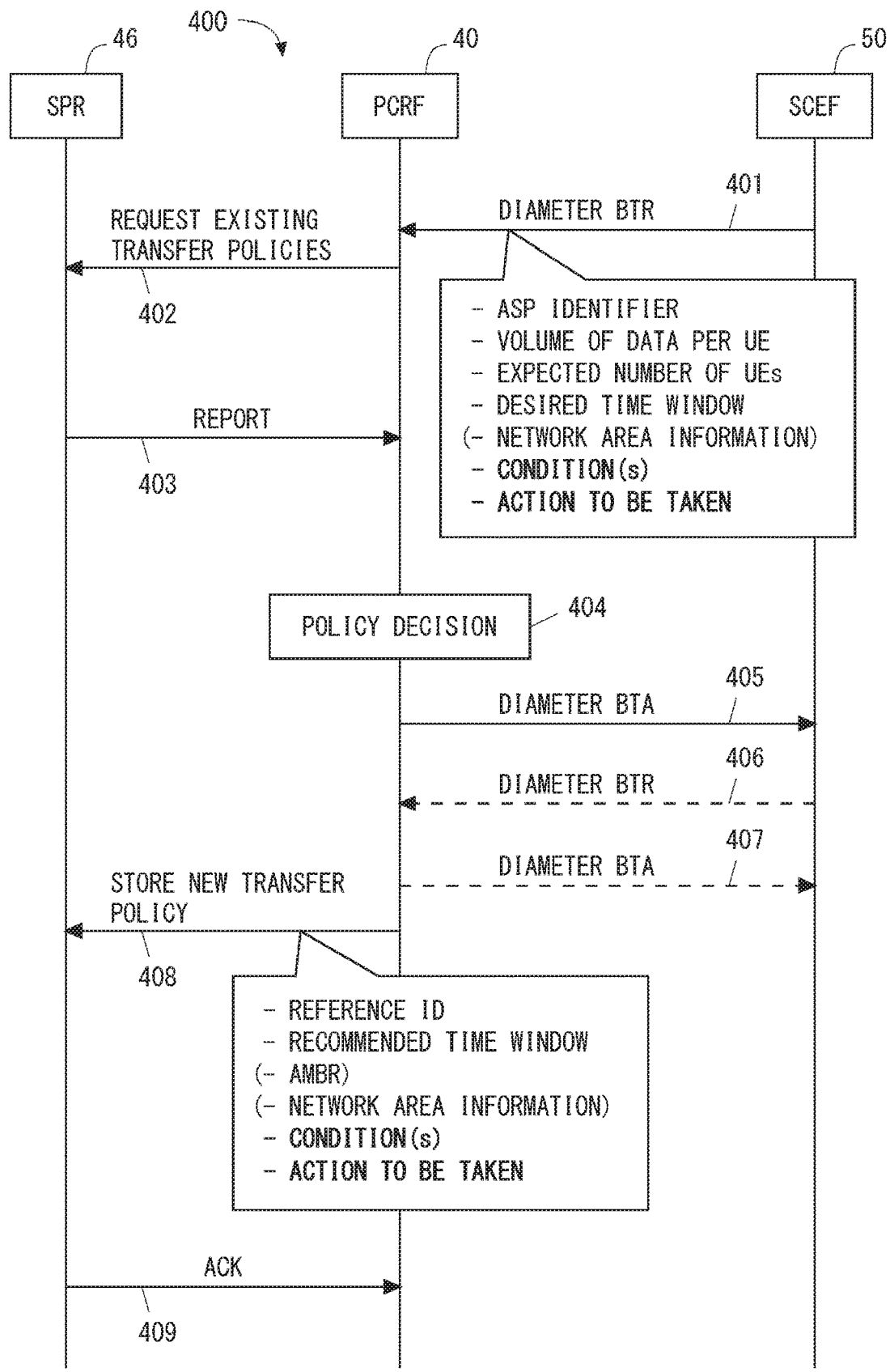
FIG. 4 is a sequence diagram showing an example of operations of SCEF, PCRF, and SPR for negotiation for future background data transfer.

FIG. 4 shows a process 400 that is an example of the operations of the SCEF 50, PCRF 40, and SPR 46 for the negotiation for future background data transfer. In Step 401, the SCEF 50 sends a DIAMETER Background-Data-Transfer-Request (BTR) command to the PCRF 40 based on the background data transfer request (i.e., Step 301 in FIG. 4) from the SCS/AS 60. This BTR command includes parameters obtained from the background data transfer request sent from the SCS/AS 60. Specifically, in the example of FIG. 4, the BTR command indicates whether background data transfer should be stopped, or whether the background data transfer should continue under a charging rule different from a previously agreed charging rule, when the background data transfer does not comply with a previously agreed or negotiated transfer policy.

As shown in FIG. 4, new parameters contained in the BTR command of Step 401 may indicate one or more conditions representing an activity not complying with the previously agreed transfer policy and an action to be taken when each condition is met. As described above, one or more conditions may be that the background data transfer (a) exceeds the previously agreed maximum data volume, (b) continues beyond the previously agreed time window, or (c) happens outside the previously agreed (geographic) area(s). The action to be taken when each condition is met may be stopping the data transfer or continuing the data transfer under the different charging rule.

The processes of Steps 402 and 403 are similar to those performed in the existing negotiation procedure. Specifically, in Step 402, the PCRF 40 requests the SPR 46 for all existing transfer policies. In Step 403, the SPR 46 provides all existing transfer policies and corresponding network area information to the PCRF 40.

In Step 404, the PCRF 40 determines one or more transfer policies, based on the information provided by the AF (i.e., SCS/AS 60, SCEF 50, or both) and other available information. Other available information includes, for example, a network policy, congestion level (if available), load status estimation for the required time window, and existing transfer policies.

The processes of Steps 405 to 407 are similar to those of Steps 204 to 206 of FIG. 2. In Step 408, the reference ID is stored in the SPR 46 together with a new transfer policy. This new transfer policy indicates whether the background data transfer should be stopped, or whether the background data transfer should continue under the charging rule different from the previously agreed charging rule, when the background data transfer does not comply with the previously agreed or negotiated transfer policy.

As shown in FIG. 4, the new transfer policy stored in the SPR 46 in Step 408 may indicate one or more conditions representing an activity not complying with the previously agreed transfer policy and an action to be taken when each condition is met. As described above, one or more conditions may be that the background data transfer (a) exceeds the previously agreed maximum data volume, (b) continues beyond the previously agreed time window, or (c) happens outside the previously agreed (geographic) areas. The action to be taken when each condition is met may be stopping the data transfer or continuing the data transfer under the different charging rule.

In Step 409, the SPR 46 sends an acknowledgment to the PCRF 40.

According to the future background data transfer procedure described with reference to FIGS. 3 and 4, the SCS/AS 60 can inform the PCRF 40 via the SCEF 50 how the background data transfer not complying with the previously agreed transfer policy should be treated. The procedure described with reference to FIGS. 3 and 4 thus enables the application service provider (or the application server thereof) to negotiate with the radio communication network (e.g., 3GPP network) about the handling of background data transfer in the radio communication network when the background data transfer does not comply with the previously agreed transfer policy.

Figure 5:
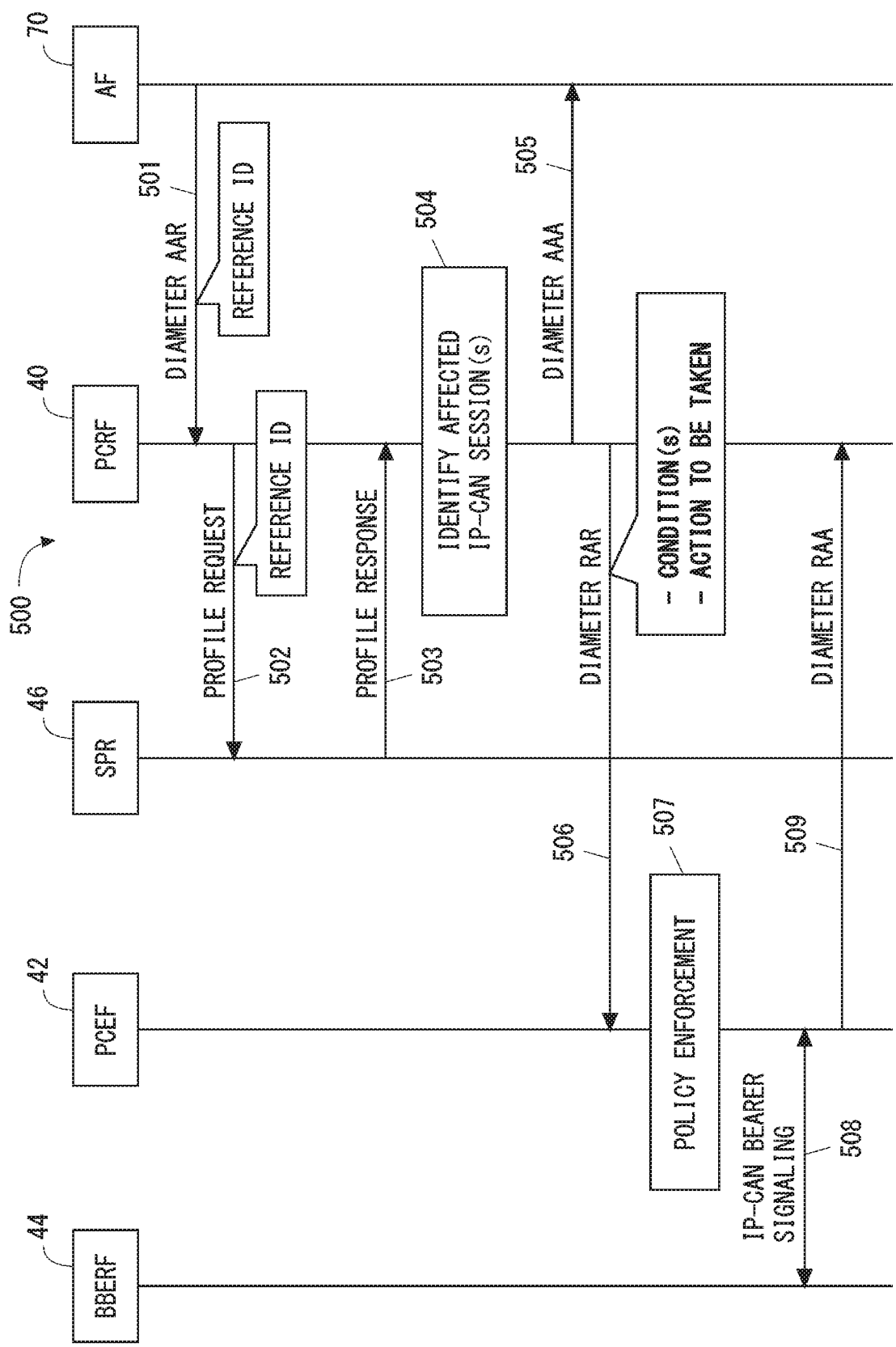
FIG. 5 is a sequence diagram showing an example of operations of SCEF, PCRF, and SPR for execution of background data transfer.

The following describes the execution procedure of background data transfer for individual UEs. FIG. 5 shows a process 500 that is an example of an IP-CAN session modification procedure initiated by the PCRF 40 in response to a trigger from the AF 70. In FIG. 5, the AF 70 corresponds to the SCS/AS 60 or the SCEF 50. The PCEF 42 is located in the P-GW 32, while the BBERF 44 is located in the S-GW 34.

In Step 501, the AF 70 sends a DIAMETER AA-Request (AAR) command to the PCRF 40 to establish a new AF session, or to modify an existing AF session, for background data transfer for individual UEs. This DIAMETER AAR command includes a reference ID and service information (or SCS/AS session information or AF session information). The reference ID is associated with a transfer policy that has been previously agreed with the PCRF 40 (or another PCRF) for the background data transfer. The service information includes an IP address(es) of an IP flow(s), port numbers to be used, and so forth. The reference ID is described in a Reference-Id Attribute Value Pair (AVP) contained in the DIAMETER AAR command. Meanwhile, the service information is represented by a plurality of AVPs (e.g., Flow-Description AVP, Flow-Number AVP, Framed-IP-Address AVP, Framed-Ipv6-Prefix AVP, and IP-Domain-Id AVP) contained in the DIAMETER AAR command. The AF 70 typically requests the sponsored (data) connectivity for the background data transfer for individual UEs. Accordingly, the service information may include a Sponsored-Connectivity-Data AVP for the sponsored (data) connectivity. The Sponsored-Connectivity-Data AVP includes an ASP identifier and a sponsor identity.

The PCRF 40 stores the received service information. In addition, in response to receiving the Reference-Id AVP, the PCRF 40 retrieves the corresponding transfer policy from the SPR 46 (Steps 502 and 503). This transfer policy indicates whether background data transfer should be stopped, or whether the background data transfer should continue under a charging rule different from the previously agreed charging rule, when the background data transfer does not comply with the previously agreed transfer policy. As already described, the transfer policy may indicate one or more conditions representing an activity not complying with the previously agreed transfer policy and an action to be taken when each condition is met. The one or more conditions may be that the background data transfer (a) exceeds the previously agreed maximum data volume, (b) continues beyond the previously agreed time window, or (c) happens outside the previously agreed (geographic) area(s). The action to be taken when each condition is met may be stopping the data transfer or continuing the data transfer under the different charging rule.

Furthermore, the PCRF 40 derives a dynamic PCC rules(s) for the background data transfer in accordance with the transfer policy. This PCC rule includes a service data flow (SDF) template for detecting a service data flow for the background data transfer and parameters for policy control and charging control on the service data flow. The parameters for the policy control and charging control include, for example, an ASP Identifier, a QoS class identifier, an UL-maximum bitrate, a DL-maximum bitrate, a Gate status, or any combination thereof. Moreover, this PCC rule may include an agreed time window for background data transfer and an agreed maximum volume of data per UE (or per SDF). The PCC rule may also include one or both of a maximum data transfer rate (i.e., rate quota) per UE (or per SDF) and a maximum amount of data bytes (i.e., byte quota) per UE (or per SDF).

Furthermore, this PCC rule may indicate one or more conditions representing an activity not complying with the previously agreed transfer policy and an action to be taken when each condition is met. The one or more conditions may be that the background data transfer (a) exceeds the previously agreed maximum data volume, (b) continues beyond the previously agreed time window, or (c) happens outside the previously agreed (geographic) area(s). The action to be taken when each condition is met may be stopping the data transfer or continuing the data transfer under the different charging rule.

In Step 504, the PCRF 40 identifies an established IP-CAN session(s) which may be affected, using the information that has been previously received from the PCEF 42 and another PCRF and also using the service information received from the AF 70.

In Step 505, the PCRF 40 sends a Diameter AA-Answer (AAA) command to the AF 70.

In Step 506, the PCRF 40 sends a DIAMETER Re-Auth-Request (RAR) message to the PCEF 42 to request the PCEF 42 to install or modify the PCC rule. The DIAMETER RAR message contains the PCC rule and triggers the IP-CAN Session Modification procedure.

In Step 507, the PCEF 42 enforces the PCC rule provided by the PCRF 40. In Step 508, the PCEF 42 located in the P-GW 32 performs IP-CAN bearer signaling with the BBERF 44 located in the S-GW 34 to establish or modify an IP-CAN bearer. In Step 509, the PCEF 42 sends a DIAMETER RA-Answer (RAA) message to the PCRF 40.

According to the procedure described with reference to FIG. 5, the PCRF 40 can inform the PCEF 42 how the background data transfer not complying with the previously agreed transfer policy should be treated. This allows the PCEF 42 (i.e., P-GW 32), for example, to determine whether background data transfer should be stopped or should continue when the background data transfer (a) exceeds the previously agreed maximum data volume, (b) continues beyond the previously agreed time window, or (c) happens outside the previously agreed (geographic) area(s).

Second Embodiment

This embodiment provides a modified example of the background data transfer described in the first embodiment. A configuration example of a communication network according to this embodiment is similar to that shown in FIG. 1. A negotiation procedure for future background data transfer according to this embodiment is similar to the procedure described with reference to FIGS. 2, 3, and 4. A procedure for performing the background data transfer for individual UEs according to this embodiment is similar to the procedure described with reference to FIGS. 2 and 5. However, the PCC rule for background data transfer to be enforced by the PCEF 42 (P-GW 32) requests the PCEF 42 to inform the PCEF 42 about a detection of background data transfer not complying with a previously agreed transfer policy.

Figure 6:
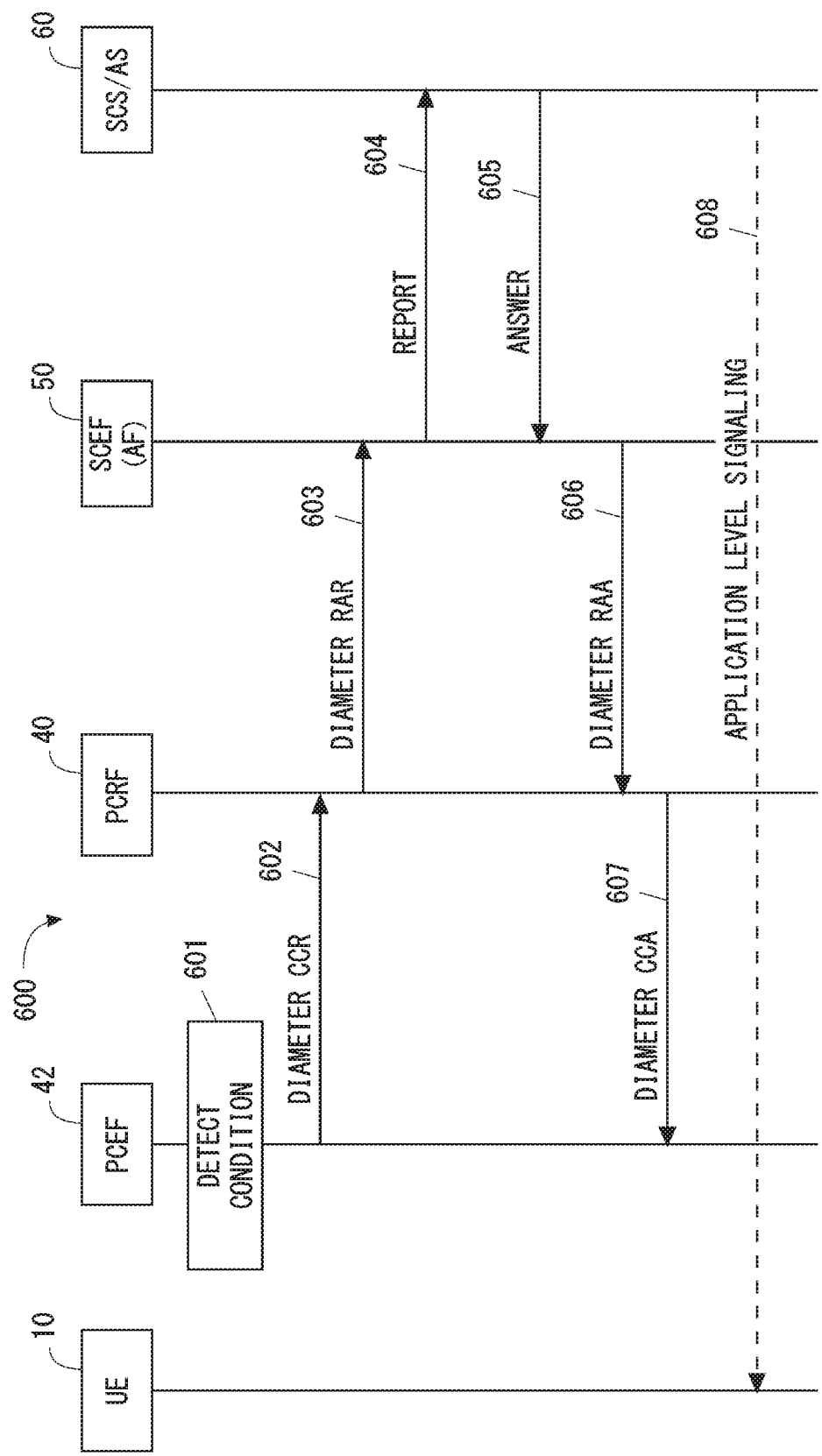
FIG. 6 is a sequence diagram showing an example of a procedure for detecting background data transfer not complying with a previously agreed transfer policy.

FIG. 6 shows a process 600 that is an example of a procedure for detecting and notifying background data transfer not complying with the previously agreed transfer policy. In Step 601, the PCEF 42 detects that one or more conditions representing an activity not complying with the transfer policy have been met. The PCEF 42 may monitor at least one of uplink and downlink traffic regarding the UE 10 or a set of UEs to detect satisfaction of one or more conditions representing an activity not complying with the transfer policy. Additionally or alternatively, the PCEF 42 may monitor location information of the UE 10 or the set of UEs to detect satisfaction of one or more conditions representing an activity not complying with the transfer policy.

In Step 602, the PCEF 42 informs the PCRF 40 about the detected condition by sending a DIAMETER Credit-Control-Request (CCR) message to the PCRF 40. This DIAMETER CCR message contains, for example, the detected condition and a Rule identifier for identifying the PCC rule. Furthermore, the DIAMETER CCR message may include a UE ID of the UE monitored by the PCEF 42 (i.e., the UE for which background data transfer not complying with the transfer policy has been detected) and may include information indicating a geographic area regarding this UE.

In response to receiving the DIAMETER CCR message, the PCRF 40 derives the corresponding transfer policy and reference ID. In Step 603, the PCRF 40 sends a DIAMETER RAR message to the SCEF 50 (acting as an AF). This DIAMETER RAR message indicates the reference ID and the detected condition (representing an activity not complying with the previously agreed transfer policy). This DIAMETER RAR message may further include the UE ID of the UE monitored by the PCEF 42 (i.e., the UE for which background data transfer not complying with the transfer policy has been detected) and may include information indicating the geographic area regarding this UE.

In Step 604, the SCEF 50 sends a report message to the SCS/AS 60 via the API. The report message indicates the reference ID and the detected condition (representing an activity not complying with the previously agreed transfer policy). The report message may further include, for example, the UE ID of the UE monitored by the PCEF 42 (i.e., the UE for which background data transfer not complying with the transfer policy has been detected) and may include information indicating the geographic area regarding this UE.

In Step 605, the SCEF 50 receives from the SCS/AS 60 a response message indicating an acknowledgment. In Step 606, the SCEF 50 sends to the PCRF 40 a DIAMETER RAA message indicating an acknowledgment. In Step 607, the PCRF 40 sends to the PCEF 42 a DIAMETER CAA message indicating an acknowledgment.

As already described, the SCS/AS 60 may act as an AF and communicate directly with the PCRF 40 via the Rx interface. In this case, the SCS/AS 60 acting as an AF may receive the DIAMETER RAR message of Step 603 directly from the PCRF 40 via the Rx interface and send the DIAMETER RAA message of Step 606 directly to the PCRF 40 via the Rx interface.

The SCS/AS 60 may perform application level signaling with the UE 10 to inform the UE 10 about suspension of the downlink background data transfer to the UE 10 (Step 608). Additionally or alternatively, the SCS/AS 60 may perform the application level signaling with the UE 10 to inform the UE 10 about suspension of uplink background data transfer from the UE 10 (Step 608). The UE 10 may stop uplink data transmission according to the application level signaling with the SCS/AS 60.

When the PCEF 42 (P-GW 32) transfers more packets of the service data flow for the background data transfer after receiving the DIAMETER CAA message of Step 607, it may generate a Charging Data Record (CDR) according to the different charging rule (or charging regime). The CDR means formatted charging information (e.g., data transfer amount).

According to the procedure described with reference to FIG. 6, the radio access network (i.e., 3GPP network) can inform the application service provider (i.e., SCS/AS 60) about an occurrence of the background data transfer not complying with the previously agreed transfer policy.

Third Embodiment

This embodiment provides a modified example of the background data transfer described in the first embodiment. A configuration example of a communication network according to this embodiment is similar to that shown in FIG. 1. A negotiation procedure for future background data transfer according to this embodiment is similar to the procedure described with reference to FIGS. 2, 3, and 4. A procedure for performing the background data transfer for individual UEs according to this embodiment is similar to the procedure described with reference to FIGS. 2 and 5.

Figure 7:
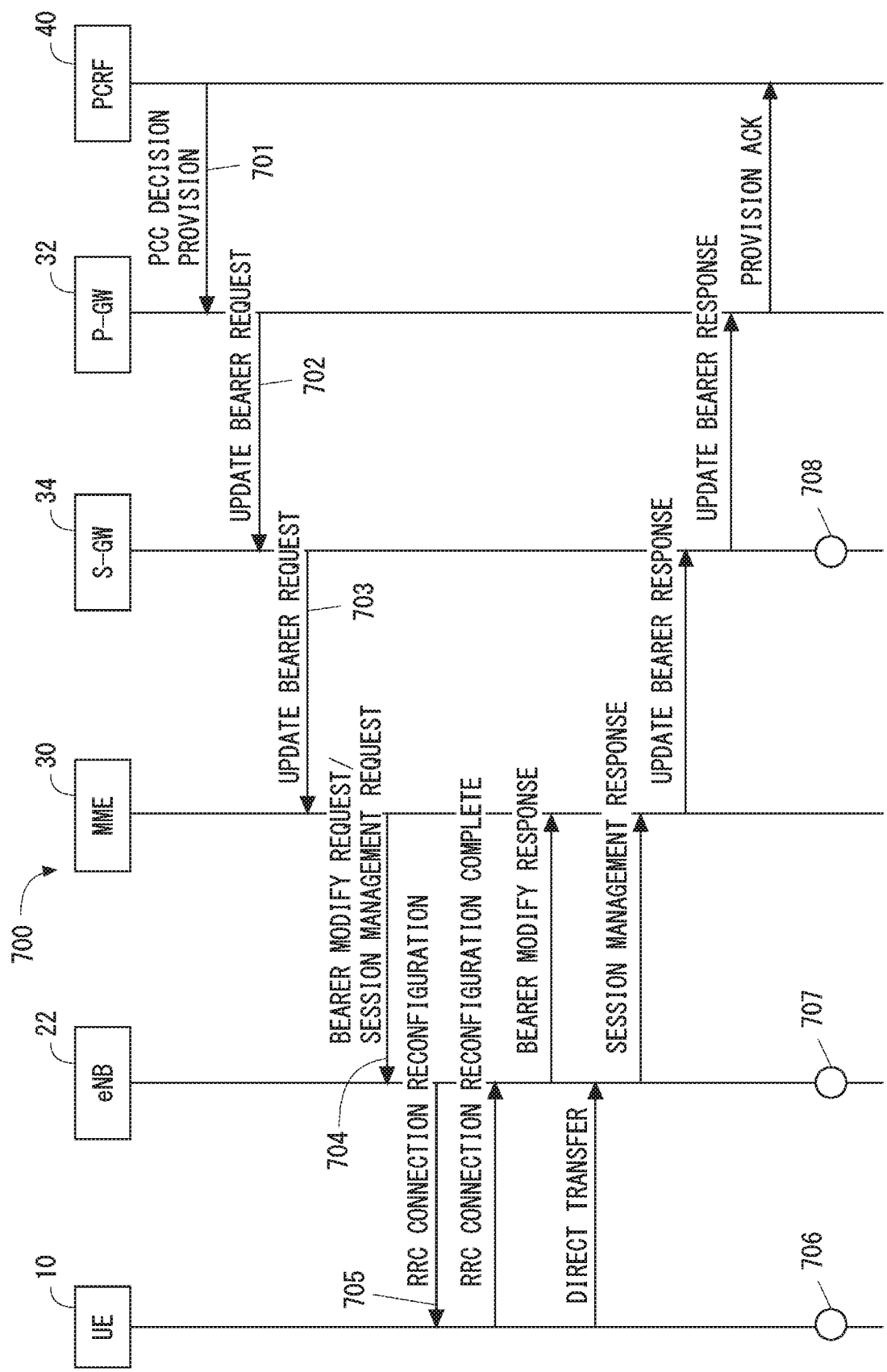
FIG. 7 is a sequence diagram showing an example of a procedure for detecting background data transfer not complying with a previously agreed transfer policy.

This embodiment further enables the E-UTRAN 20 to stop background data transfer not complying with a previously agreed transfer policy. FIG. 7 shows a process 600 that is an example of the Bearer Modification Procedure according to this embodiment. The Bearer Modification Procedure shown in FIG. 7 is triggered by the IP-CAN session modification procedure (e.g., procedure of FIG. 5) initiated by the PCRF 40.

In Step 701, the PCRF 40 sends a PCC Decision Provision message to the P-GW 32. The PCC Decision Provision message of Step 701 corresponds to the DIAMETER RAR message of Step 506 of FIG. 5. This PCC Decision Provision message triggers the P-GW 32 to initiate the Bearer Modification Procedure.

An Update Bearer Request message of Step 702 is sent from the P-GW 32 to the S-GW 34. An Update Bearer Request message of Step 703 is sent from the S-GW 34 to the MME 30. A Bearer Modify Request message of Step 704 is sent from the MME 30 to a base station (i.e., eNodeB (eNB) 22) within the E-UTRAN 20. The Bearer Modify Request message of Step 704 contains a Session Management Request sent from the MME 30 to the UE 10. An RRC Connection Reconfiguration message of Step 705 from the eNB 22 to the UE 10 contains this Session Management Request. The overall flow of the procedure shown in FIG. 7 is identical to that of the existing Bearer Modification Procedure. Thus, detailed descriptions of the messages of Step 702 and its subsequent steps are omitted here.

In this embodiment, by using the messages of Steps 702 to 704, the PCRF 40 configures the base station (i.e., eNodeB (eNB) 22) within the E-UTRAN 20 to stop uplink background data transfer not complying with the previously agreed transfer policy.

Specifically, the messages of Steps 702 to 704 may include an agreed time window for background data transfer, or an agreed maximum volume of data per UE (or per SDF), or both.

The message of Steps 702 to 704 may also include network area information (e.g., a list of Tracking Areas (TAs) or Routing Areas (RAs)) corresponding to a geographic area(s) agreed for the background data transfer. The message of Steps 702 to 704 may further include one or both of a maximum data transfer rate (i.e., rate quota) per UE (or per SDF) and a maximum amount of data bytes (i.e., byte quota) per UE (or per SDF).

Furthermore, the messages of Steps 702 to 704 may indicate one or more conditions representing an activity not complying with the transfer policy and an action to be taken when each condition is met. The one or more conditions may be that the background data transfer (a) exceeds the previously agreed maximum data volume, (b) continues beyond the previously agreed time window, or (c) happens outside the previously agreed (geographic) area(s). The action to be taken when each condition is met may be stopping the data transfer or continuing the data transfer under a different charging rule.

According to the above-described procedure, for example, the eNB 22 can discard, at the eNB 22, uplink packets sent from the UE 10 not complying with the previously agreed transfer policy for the background data transfer (Step 707). Such an operation of the eNB 22 contributes to avoiding an increase in a load of the core network due to transferring of uplink packets not complying with the previously agreed transfer policy for the background data transfer.

Instead of the eNB 22, the S-GW 34 may operate to discard uplink packets not complying with the previously agreed transfer policy for the background data transfer (Step 708). In this case, the Bearer Modify Request message of Step 704 does not need to include the above-described additional information regarding the transfer policy for the background data transfer. Such an operation of the S-GW 34 also contributes to avoiding an increase in a load of the core network due to transferring of uplink packets not complying with the previously agreed transfer policy for the background data transfer.

Instead of the eNB 22, the UE 10 may operate to discard uplink packets not complying with the previously agreed transfer policy for the background data transfer (Step 706). In this case, the RRC Connection Reconfiguration message of Step 705 may include the above-described additional information regarding the transfer policy for the background data transfer. Such an operation of the UE 10 also contributes to avoiding an increase in a load of the core network due to transferring of uplink packets not complying with the previously agreed transfer policy for the background data transfer.

When a new dedicated bearer is established to modify the IP-CAN session for the background data transfer, a dedicated bearer activation procedure may be used instead of the bearer modification procedure shown in FIG. 7.

Fourth Embodiment

This embodiment provides a modified example of the operation of the eNB 22 described in the third embodiment. A configuration example of a communication network according to this embodiment is similar to that shown in FIG. 1. A negotiation procedure for future background data transfer according to this embodiment is similar to the procedure described with reference to FIGS. 2, 3, and 4. A procedure for performing the background data transfer for individual UEs according to this embodiment is similar to the procedure described with reference to FIGS. 2 and 5. The procedure for configuring the eNB 22 to handle uplink packets not complying with the previously agreed transfer policy for the background data transfer is similar to the procedure described with reference to FIG. 7.

In this embodiment, the eNB 22 is configured to, when the UE 10 participating in the background data transfer is handed over to another eNB (target eNB), send to the target eNB an accumulated value of the data volume of the UE 10 in the background data transfer. In other words, the target eNB takes over the accumulated value of the data volume of the UE 10 in the background data transfer from the source eNB.

Figure 8:
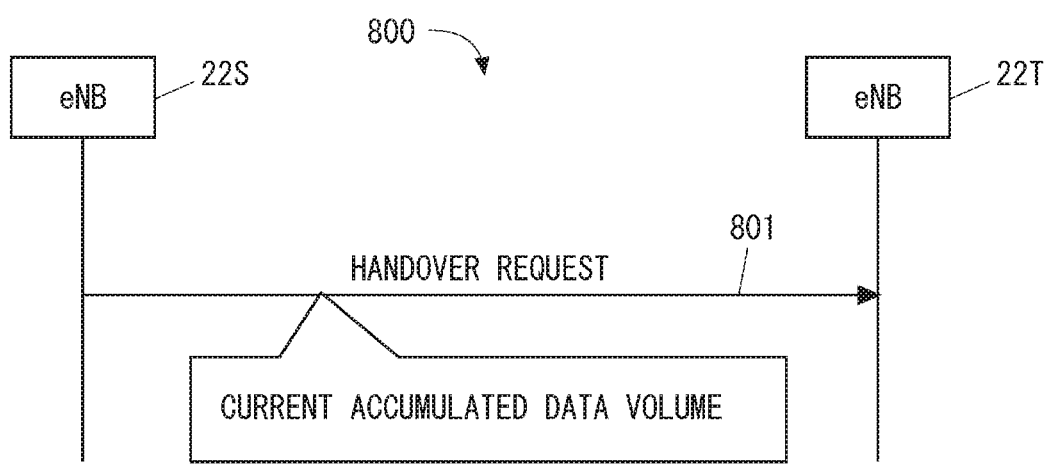
FIG. 8 is a sequence diagram showing an example of a procedure for transferring, among eNBs, parameters used for detecting background data transfer not complying with a previously agreed transfer policy.

FIG. 8 shows a process 800 that is an example of the operations of a source eNB 22S and a target eNB 22T according to this embodiment. In Step 801, the source eNB 22S sends a handover request containing the current accumulated data volume (i.e., accumulated value of the data volume) to the target eNB 22T via an inter-eNB interface (i.e., X2 interface).

In this embodiment, even when the UE 10 participating in the background data transfer moves between eNBs, the E-UTRAN 20 can obtain a precise accumulated value of the data volume of the UE 10 to be used to detect an activity not complying with the transfer policy for the background data transfer.

Figure 9:
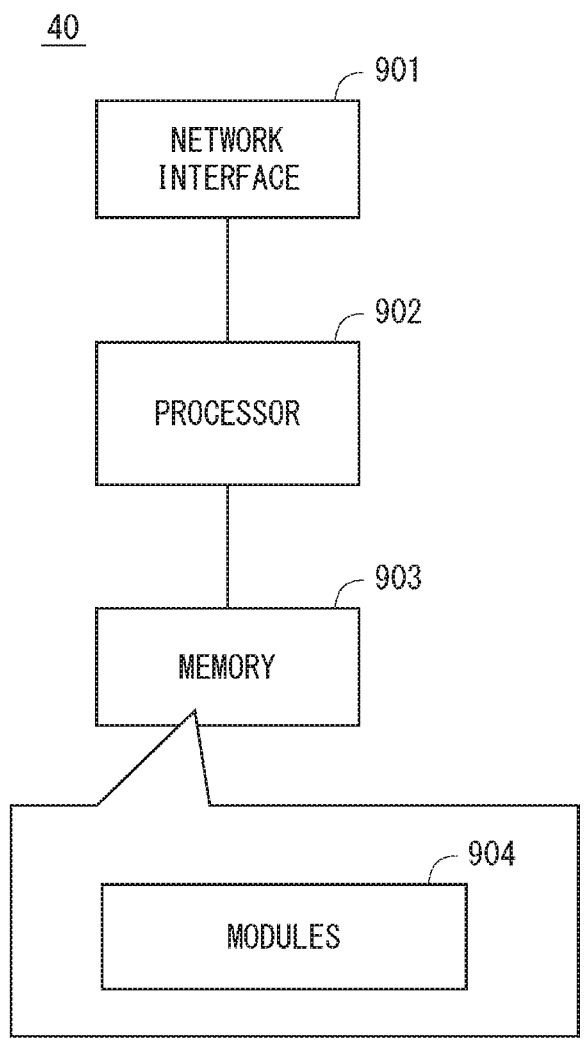
FIG. 9 is a diagram showing a configuration example of a PCRF according to embodiments.

The following provides configuration examples of the UE 10, the eNB 22, the PCRF 40, the PCEF 42, the SPR 46, the SCEF 50, and the SCS/AS 60 according the above embodiments. FIG. 9 is a block diagram showing a configuration example of the PCRF 40. The configurations of the PCEF 42, SPR 46, SCEF 50, and SCS/AS 60 may be similar to that shown in FIG. 9.

Referring to FIG. 9, the PCRF 40 includes a network interface 901, a processor 902, and a memory 903. The network interface 901 is used to communicate with network entities (e.g., end node, intermediate node, UE, RAN node, CN node, application server). The network interface 901 may include, for example, a network interface card (NIC) conforming to the IEEE 802.3 series.

The processor 902 loads software (computer) from the memory 903 and executes the loaded software, thereby performing the processing of the PCRF 40 described in the above embodiments. The processor 902 may be, for example, a microprocessor, Micro Processing Unit (MPU), or Central Processing Unit (CPU). The processor 902 may include a plurality of processors.

The memory 903 is composed of a volatile memory and a non-volatile memory. The memory 903 may include a plurality of physically independent memory devices. The volatile memory is, for example, a Static Random Access Memory (SRAM), a Dynamic RAM (DRAM), or a combination thereof. The non-volatile memory is a Mask Read Only Memory (MROM), an Electrically Erasable Programmable ROM (EEPROM), a flash memory, a hard disk drive, or any combination thereof. The memory 903 may include a storage located separately from the processor 902. In this case, the processor 902 may access the memory 903 via an I/O interface (not shown).

The memory 903 may store one or more software modules (computer programs) 904 including instructions and data for processing by the PCRF 40 described in the above embodiments. In some implementations, the processor 902 may load the software module 904 from the memory 903 and execute the loaded software module, thereby performing the processing of the PCRF 40 described in the above embodiments.

Figure 10:
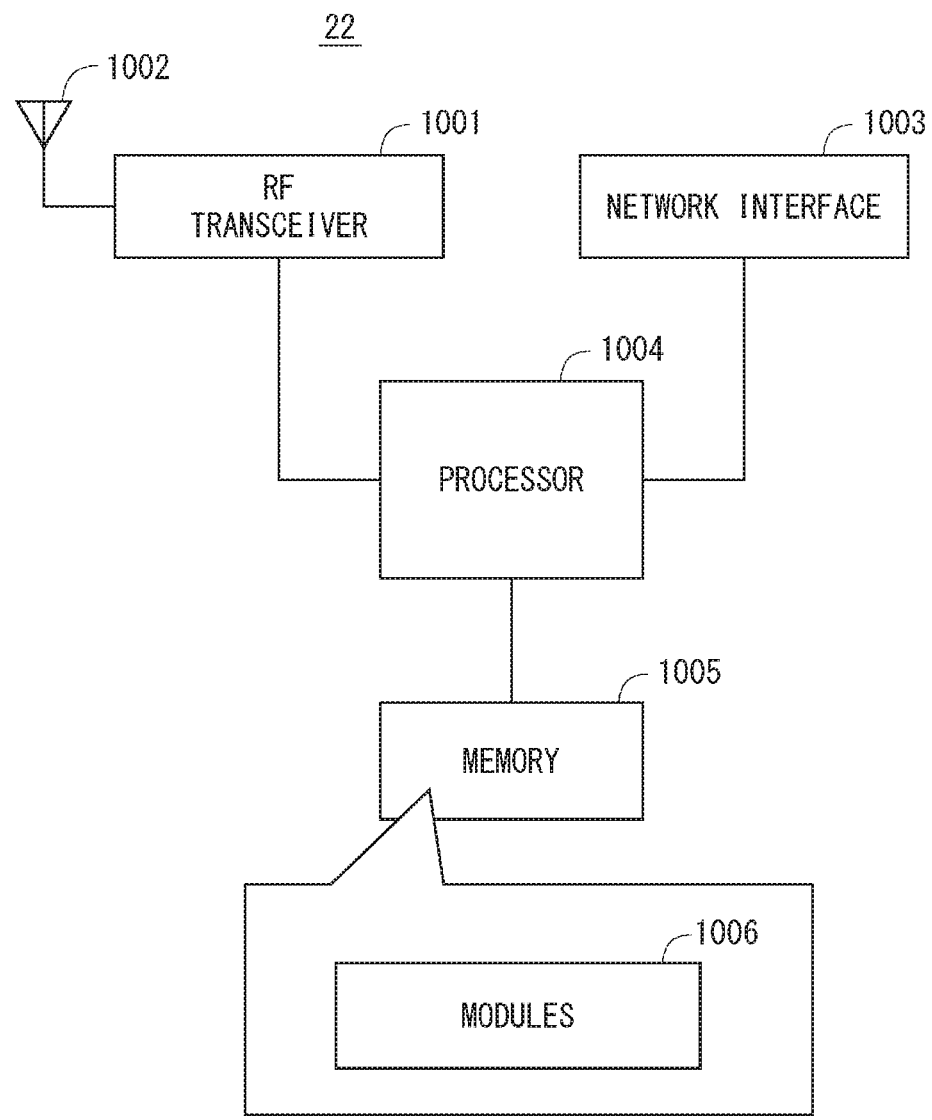
FIG. 10 is a diagram showing a configuration example of an eNB according to embodiments.

FIG. 10 is a block diagram showing a configuration example of the eNB 22 according to the above embodiments. Referring to FIG. 10, the eNB 22 includes a Radio Frequency (RF) transceiver 1001, a network interface 1003, a processor 1004, and a memory 1005. A Radio Frequency (RF) transceiver 1001 performs analog RF signal processing to communicate with the UE 10. The RF transceiver 1001 may include a plurality of transceivers. The RF transceiver 1001 is coupled to an antenna 1002 and a processor 1004. The RF transceiver 1001 receives modulation symbol data (or OFDM symbol data) from the processor 1004, generates a transmission RF signal, and supplies the transmission RF signal to the antenna 1002. Moreover, the RF transceiver 1001 generates a baseband reception signal based on a reception RF signal received by the antenna 1002, and supplies the baseband reception signal to the processor 1004.

The network interface 1003 is used to communicate with network nodes (e.g., MME 30 and S-GW 34). The network interface 1003 may include, for example, a network interface card (NIC) conforming to the IEEE 802.3 series.

The processor 1004 performs digital baseband signal processing (data-plane processing) and control-plane processing for radio communication. In the case of LTE and LTE-Advanced, for example, the digital baseband signal processing performed by the processor 1004 may include signal processing of the Packet Data Convergence Protocol (PDCP) layer, Radio Link Control (RLC) layer, Medium Access Control (MAC) layer, and physical (PHY) layer. Further, the control-plane processing performed by the processor 1004 may include the processing of the Si protocol, Radio Resource Control (RRC) protocol, and MAC Control Elements (MAC CEs).

The processor 1004 may include a plurality of processors. The processor 1004 may include a modem processor (e.g., Digital Signal Processor (DSP)) that performs the digital baseband signal processing and a protocol stack processor (e.g., CPU or MPU) that performs the control-plane processing.

The memory 1005 is composed of a combination of a volatile memory and a non-volatile memory. The volatile memory is, for example, an SRAM, a DRAM, or a combination thereof. The non-volatile memory may be a MROM, a PROM, a flash memory, a hard disk drive, or a combination thereof. The memory 1005 may include a storage located separately from the processor 1004. In this case, the processor 1004 may access the memory 1005 via the network interface 1003 or an I/O interface not shown.

The memory 1005 may store one or more software modules (computer programs) 1006 including instructions and data for processing by the eNB 22 described in the above embodiments. In some implementations, the processor 1004 may load the software module 1006 from the memory 1005 and execute the loaded software module, thereby performing the processing of the eNB 22 described in the above embodiments with reference to the sequence diagrams and the flowcharts in the above embodiments.

Figure 11:
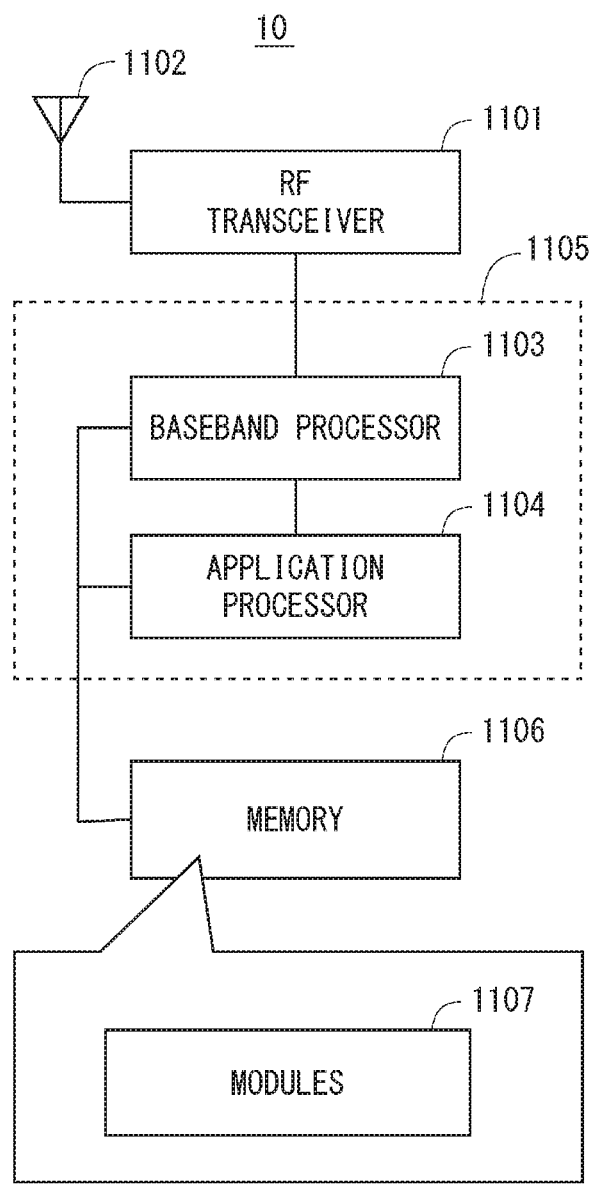
FIG. 11 is a diagram showing a configuration example of a UE according to embodiments.

FIG. 11 is a block diagram showing a configuration example of the UE 10. A Radio Frequency (RF) transceiver 1101 performs analog RF signal processing to communicate with the E-UTRAN 20 (eNB 22). The RF transceiver 1101 may include a plurality of transceivers. The analog RF signal processing performed by the RF transceiver 1101 includes frequency up-conversion, frequency down-conversion, and amplification. The RF transceiver 1101 is coupled to an antenna array 1102 and a baseband processor 1103. The RF transceiver 1101 receives modulation symbol data (or OFDM symbol data) from the baseband processor 1103, generates a transmission RF signal, and supplies the transmission RF signal to the antenna array 1102. Moreover, the RF transceiver 1101 generates a baseband reception signal based on a reception RF signal received by the antenna array 1102, and supplies the baseband reception signal to the baseband processor 1103. The RF transceiver 1101 may include an analog beamformer circuit for beamforming. The analog beamformer circuit includes, for example, a plurality of phase shifters and a plurality of power amplifiers.

The baseband processor 1103 performs digital baseband signal processing (data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of the layer 1 (e.g., transmission power control), layer 2 (e.g., radio resource management and hybrid automatic repeat request (HARQ) processing), and layer 3 (e.g., signaling regarding attach, mobility, and call management).

For example, the digital baseband signal processing performed by the baseband processor 1103 may include signal processing of the PDCP layer, RLC layer, MAC layer, and PHY layer. Further, the control-plane processing performed by the baseband processor 1103 may include the processing of the Non-Access Stratum (NAS) protocol, RRC protocol, and MAC CEs.

The baseband processor 1103 may include a modem processor (e.g., DSP) that performs the digital baseband signal processing and a protocol stack processor (e.g., CPU or MPU) that performs the control-plane processing. In this case, the protocol stack processor, which performs the control-plane processing, may be integrated with an application processor 1104 described in the following.

The application processor 1104 may also be referred to as a CPU, an MPU, a microprocessor, or a processor core. The application processor 1104 may include a plurality of processors (processor cores). The application processor 1104 loads a system software program (Operating System (OS)) and various application programs (e.g., a voice call application, a WEB browser, a mailer, a camera operation application) from a memory 1106 or from another memory (not shown) and executes these programs, thereby providing various functions of the UE 10.

In some implementations, as represented by the dashed line (1105) in FIG. 11, the baseband processor 1103 and the application processor 1104 may be integrated on a single chip. In other words, the baseband processor 1103 and the application processor 1104 may be implemented in a single System on Chip (SoC) device 1105. A SoC device may be referred to as a system Large Scale Integration (LSI) or a chipset.

The memory 1106 is a volatile memory or a non-volatile memory or a combination thereof. The memory 1106 is a volatile memory or a non-volatile memory or a combination thereof. The volatile memory is, for example, SRAM, DRAM or a combination thereof. The non-volatile memory may be MROM, an EEPROM, a flash memory, a hard disk drive, or any combination thereof. The memory 1106 may include, for example, an external memory device that can be accessed from the baseband processor 1103, the application processor 1104, or the SoC 1105. The memory 1106 may include an internal memory device integrated within the baseband processor 1103, the application processor 1104, or the SoC 1105. Further, the memory 1106 may include a memory in a Universal Integrated Circuit Card (UICC).

The memory 1106 may store one or more software modules (computer programs) 1107 including instructions and data for processing by the UE 10 described in the above embodiments. In some implementations, the baseband processor 1103 or the application processor 1104 may load the software module 1107 from the memory 1106 and execute the loaded software modules, thereby performing the processing of the UE 10 described in the above embodiments with reference to the drawings.

Other Embodiments

Each of the above embodiments may be used individually, or two or more of the embodiments may be appropriately combined with one another.

As already described, the above embodiments may be applied to the 5th generation mobile communication system (5G). In this case, the above-described processing of the SCEF 50, PCRF 40, PCEF 42, BBERF 44, MME 30, P-GW 32, S-GW 34, eNB 22, and UE 10 may be performed by a Network Exposure Function (NEF), a Policy Control Function (PCF), a User Plane Function (UPF), an Access and Mobility Management Function (AMF), a Session Management Function (SMF), a Session Management Function (SMF), a gNB, and a 5G UE, respectively.

The above-described embodiments may be applied to the UMTS system (3G system). In this case, the above-described processing of the MME 30, P-GW 32, S-GW 34, eNB 22, and UE 10 may be performed by a Serving GPRS Support Node (SGSN), a Gateway GPRS Support Node (GGSN), an SGSN, a NodeB, and a 3G UE, respectively.

The above-described embodiments are merely examples of applications of the technical ideas obtained by the inventors. These technical ideas are not limited to the above-described embodiments and various modifications may be made thereto.

The whole or part of the above embodiments can be described as, but not limited to, the following supplementary notes.

(Supplementary Note 1)

An exposure node located in a radio communication network, the exposure node comprising:
at least one memory; and
at least one processor coupled to the at least one memory, wherein
the at least one processor is configured to receive, from a server associated with an application service provider, a first request for resource management for future background data transfer between the application service provider and a plurality of radio terminals,
the first request includes a parameter indicating whether the background data transfer should be stopped, or whether the background data transfer should continue under a charging rule different from a previously agreed charging rule, when the background data transfer does not comply with a previously agreed or negotiated transfer policy,
the at least one processor is configured to, in response to receiving the first request, send to a policy control node within the radio communication network a second request for the resource management for the background data transfer,
the second request includes the parameter obtained from the first request, and
the at least one processor is configured to send to the server a transfer policy determined by the policy control node based on the second request to be applied to the background data transfer.

(Supplementary Note 2)

The exposure node according to Supplementary note 1, wherein
the previously agreed or negotiated transfer policy includes a previously agreed maximum data volume, and
the parameter indicates whether the background data transfer should be stopped, or whether the background data transfer should continue under the different charging rule, when the background data transfer exceeds the maximum data volume.

(Supplementary Note 3)

The exposure node according to Supplementary note 1 or 2, wherein
the previously agreed or negotiated transfer policy includes a previously agreed time window, and
the parameter indicates whether the background data transfer should be stopped, or whether the background data transfer should continue under the different charging rule, when the background data transfer continues beyond the time window.

(Supplementary Note 4)

The exposure node according to any one of Supplementary notes 1 to 3, wherein
the previously agreed or negotiated transfer policy includes a previously agreed geographic area, and
the parameter indicates whether the background data transfer should be stopped, or whether the background data transfer should continue under the different charging rule, when the background data transfer happens outside the geographic area.

(Supplementary Note 5)

A policy control node located in a radio communication network, the policy control node comprising:
at least one memory; and
at least one processor coupled to the at least one memory, wherein
the at least one processor is configured to receive from a server associated with an application service provider, via an exposure node, a request for resource management for future background data transfer between the application service provider and a plurality of radio terminals,
the request includes a parameter indicating whether the background data transfer should be stopped, or whether the background data transfer should continue under a charging rule different from a previously agreed charging rule, when the background data transfer does not comply with a previously agreed or negotiated transfer policy, and
the at least one processor is configured to determine a transfer policy based on the request and send the determined transfer policy to the server via the exposure node.

(Supplementary Note 6)

The policy control node according to Supplementary note 5, wherein the parameter indicates at least one of:
whether the background data transfer should be stopped, or whether the background data transfer should continue under the different charging rule, when the background data transfer exceeds a previously agreed maximum data volume;
whether the background data transfer should be stopped, or whether the background data transfer should continue under the different charging rule, when the background data transfer continues beyond a previously time window; and
whether the background data transfer should be stopped, or whether the background data transfer should continue under the different charging rule, when the background data transfer happens outside a previously agreed geographic area.

(Supplementary Note 7)

The policy control node according to Supplementary note 5 or 6, wherein the at least one processor is configured to, when the background data transfer is performed between the application service provider and an individual radio terminal, derive a policy rule to be applied to a packet flow of the radio terminal from the determined transfer policy and to provide the policy rule to a transfer node or a control plane function of the transfer node to enforce the policy rule, and the policy rule indicates whether the background data transfer should be stopped, or whether the background data transfer should continue under the different charging rule, when the background data transfer does not comply with the determined transfer policy.

(Supplementary Note 8)

The policy control node according to Supplementary note 7, wherein the providing of the policy rule to the transfer node or the control plane function triggers the transfer node or the control plane function to initiate a procedure for causing one or both of a base station and the radio terminal to enforce the policy rule.

(Supplementary Note 9)

The policy control node according to any one of Supplementary notes 5 to 8, wherein the at least one processor is configured to inform the server, directly or via the exposure node, about detection of background data transfer not complying with the determined transfer policy.

(Supplementary Note 10)

A network node located in a radio communication network, the network node comprising:
  at least one memory; and
  at least one processor coupled to the at least one memory, wherein
  the at least one processor is configured to receive, from a policy control node, a policy rule to be applied to a packet flow associated with background data transfer between an application service provider and a radio terminal,
  the at least one processor is configured to enforce the policy rule, and
  the policy rule indicates whether the background data transfer should be stopped, or whether the background data transfer should continue under a charging rule different from a previously agreed charging rule, when the background data transfer does not comply with a transfer policy previously agreed or negotiated between the application service provider and the radio communication network.

(Supplementary Note 11)

The network node according to Supplementary note 10, wherein the parameter indicates at least one of:
  whether the background data transfer should be stopped, or whether the background data transfer should continue under the different charging rule, when the background data transfer exceeds a previously agreed maximum data volume;
  whether the background data transfer should be stopped, or whether the background data transfer should continue under the different charging rule, when the background data transfer continues beyond a previously time window; and
  whether the background data transfer should be stopped, or whether the background data transfer should continue under the different charging rule, when the background data transfer happens outside a previously agreed geographic area.

(Supplementary Note 12)

The network node according to Supplementary note 10 or 11, wherein the at least one processor is configured to inform the policy control node about detection of background data transfer not complying with the transfer policy.

(Supplementary Note 13)

The network node according to any one of Supplementary notes 10 to 12, wherein the at least one processor is configured to, in response to receiving the policy rule, initiate a procedure for causing one or both of a base station and the radio terminal to enforce the policy rule in response to receiving the policy rule.

(Supplementary Note 14)

A base station located in a radio access network, the base station comprising:
  at least one memory; and
  at least one processor coupled to the at least one memory, wherein
  the at least one processor is configured to receive, from a core network, a policy rule to be applied to a packet flow associated with background data transfer between an application service provider and a radio terminal or applied to a bearer for transferring the packet flow,
  the at least one processor is configured to enforce the policy rule, and
  the policy rule indicates whether the background data transfer should be stopped when the background data transfer does not comply with a transfer policy previously agreed or negotiated between the application service provider and the core network.

(Supplementary Note 15)

The base station according to Supplementary note 14, wherein the parameter indicates at least one of:
  whether the background data transfer should be stopped when the background data transfer exceeds a previously agreed maximum data volume;
  whether the background data transfer should be stopped when the background data transfer continues beyond a previously agreed time window; and
  whether the background data transfer should be stopped when the background data transfer happens outside a previously agreed geographic area.

(Supplementary Note 16)

The base station according to Supplementary note 14 or 15, wherein
  the policy rule indicates whether the background data transfer should be stopped when the background data transfer exceeds a previously agreed maximum data volume,
  the at least one processor is configured to monitor a data volume of the radio terminal in the background data transfer to determine whether the background data transfer reaches the maximum data volume, and
  the at least one processor is configured to, when the radio terminal is handed over to another base station, send to the other base station an accumulated value of the data volume of the radio terminal in the background data transfer.

(Supplementary Note 17)

A radio terminal comprising:
  at least one memory; and
  at least one processor coupled to the at least one memory, wherein
  the at least one processor is configured to receive, from a core network via a base station, a policy rule to be applied to a packet flow associated with background data transfer between an application service provider and the radio terminal or applied to a bearer for transferring the packet flow,
  the at least one processor is configured to enforce the policy rule, and
  the policy rule indicates whether the background data transfer should be stopped when the background data transfer does not comply with a transfer policy previously agreed or negotiated between the application service provider and the core network.

(Supplementary Note 18)

The radio terminal according to Supplementary note 17, wherein the policy rule indicates at least one of:

whether the background data transfer should be stopped when the background data transfer exceeds a previously agreed maximum data volume;

whether the background data transfer should be stopped when the background data transfer continues beyond a previously agreed time window; and whether the background data transfer should be stopped when the background data transfer happens outside a previously agreed geographic area.

(Supplementary Note 19)

A method for an exposure node located in a radio communication network, the method comprising:

receiving, from a server associated with an application service provider, a first request for resource management for future background data transfer between the application service provider and a plurality of radio terminals;

in response to receiving the first request, sending to a policy control node within the radio communication network a second request for the resource management for the background data transfer; and sending to the server a transfer policy determined by the policy control node based on the second request to be applied to the background data transfer, wherein the first request includes a parameter indicating whether the background data transfer should be stopped, or whether the background data transfer should continue under a charging rule different from a previously agreed charging rule, when the background data transfer does not comply with a previously agreed or negotiated transfer policy, and the second request includes the parameter obtained from the first request.

(Supplementary Note 20)

A method for a policy control node located in a radio communication network, the method comprising:

receiving from a server associated with an application service provider, via an exposure node, a request for resource management for future background data transfer between the application service provider and a plurality of radio terminals; and determining a transfer policy based on the request and sending the determined transfer policy to the server via the exposure node, wherein the request includes a parameter indicating whether the background data transfer should be stopped, or whether the background data transfer should continue under a charging rule different from a previously agreed charging rule, when the background data transfer does not comply with a previously agreed or negotiated transfer policy.

(Supplementary Note 21)

A method for a network node located in a radio communication network, the method comprising:

receiving, from a policy control node, a policy rule to be applied to a packet flow associated with background data transfer between an application service provider and a radio terminal; and enforcing the policy rule, wherein the policy rule indicates whether the background data transfer should be stopped, or whether the background data transfer should continue under a charging rule different from a previously agreed charging rule, when the background data transfer does not comply with a transfer policy previously agreed or negotiated between the application service provider and the radio communication network.

(Supplementary Note 22)

A method for a base station located in a radio access network, the method comprising:

receiving, from a core network, a policy rule to be applied to a packet flow associated with background data transfer between an application service provider and a radio terminal or applied to a bearer for transferring the packet flow; and enforcing the policy rule, wherein the policy rule indicates whether the background data transfer should be stopped when the background data transfer does not comply with a transfer policy previously agreed or negotiated between the application service provider and the core network.

(Supplementary Note 23)

A method for a radio terminal comprising:

receiving, from a core network via a base station, a policy rule to be applied to a packet flow associated with background data transfer between an application service provider and the radio terminal or applied to a bearer for transferring the packet flow; and enforcing the policy rule, wherein the policy rule indicates whether the background data transfer should be stopped when the background data transfer does not comply with a transfer policy previously agreed or negotiated between the application service provider and the core network.

(Supplementary Note 24)

A program for causing a computer to execute a method for an exposure node located in a radio communication network, the method comprising:

receiving, from a server associated with an application service provider, a first request for resource management for future background data transfer between the application service provider and a plurality of radio terminals;

in response to receiving the first request, sending to a policy control node within the radio communication network a second request for the resource management for the background data transfer; and sending to the server a transfer policy determined by the policy control node based on the second request to be applied to the background data transfer, wherein the first request includes a parameter indicating whether the background data transfer should be stopped, or whether the background data transfer should continue under a charging rule different from a previously agreed charging rule, when the background data transfer does not comply with a previously agreed or negotiated transfer policy, and the second request includes the parameter obtained from the first request.

(Supplementary Note 25)

A program for causing a computer to execute a method for a policy control node located in a radio communication network, the method comprising:

receiving from a server associated with an application service provider, via an exposure node, a request for resource management for future background data transfer between the application service provider and a plurality of radio terminals; and determining a transfer policy based on the request and sending the determined transfer policy to the server via the exposure node, wherein the request includes a parameter indicating whether the background data transfer should be stopped, or whether the background data transfer should continue under a charging rule different from a previously agreed charging rule, when the background data transfer does not comply with a previously agreed or negotiated transfer policy.

(Supplementary Note 26)

A program for causing a computer to execute a method for a network node located in a radio communication network, the method comprising:

receiving, from a policy control node, a policy rule to be applied to a packet flow associated with background data transfer between an application service provider and a radio terminal; and enforcing the policy rule, wherein the policy rule indicates whether the background data transfer should be stopped, or whether the background data transfer should continue under a charging rule different from a previously agreed charging rule, when the background data transfer does not comply with a transfer policy previously agreed or negotiated between the application service provider and the radio communication network.

(Supplementary Note 27)

A program for causing a computer to execute a method for a base station located in a radio access network, the method comprising:

receiving, from a core network, a policy rule to be applied to a packet flow associated with background data transfer between an application service provider and a radio terminal or applied to a bearer for transferring the packet flow; and enforcing the policy rule, wherein the policy rule indicates whether the background data transfer should be stopped when the background data transfer does not comply with a transfer policy previously agreed or negotiated between the application service provider and the core network.

(Supplementary Note 28)

A program for causing a computer to execute a method for a radio terminal, the method comprising:

receiving, from a core network via a base station, a policy rule to be applied to a packet flow associated with background data transfer between an application service provider and the radio terminal or applied to a bearer for transferring the packet flow; and enforcing the policy rule, wherein the policy rule indicates whether the background data transfer should be stopped when the background data transfer does not comply with a transfer policy previously agreed or negotiated between the application service provider and the core network.

REFERENCE SIGNS LIST

10 UE
20 E-UTRAN
22 eNB
30 MME
32 P-GW
34 S-GW
40 PCRF
42 PCEF
44 BBERF
50 SCEF
60 SCS/AS
70 AF

The invention claimed is:

1. A method performed by a policy function, the method comprising:

receiving first information comprising a reference identifier (ID) for a background data transfer provided by an Application Function (AF);

retrieving policy information for the background data transfer based on the first information, the policy information comprising a Time Window and a location criteria; and sending the Time Window and the location criteria to a User Equipment (UE).

2. The method of claim 1, wherein the first information is sent by the AF to apply a policy for the background data transfer to an existing session.

3. The method of claim 1, wherein the first information o further comprises AF session information.

4. The method of claim 1, wherein a session is established by the UE based on the policy information.

5. The method of claim 1, wherein a determination concerning whether user data can be transferred, is performed by the UE based on the policy information.

6. A method performed by an Application Function (AF), the method comprising:

communicating with a policy function; and providing first information comprising a reference identifier (ID) for a background data transfer to the policy function, wherein policy information for the background data transfer is retrieved by the policy function based on the first information, wherein the policy information comprises a Time Window and a location criteria, and wherein the Time Window and the location criteria are sent to a User Equipment (UE) by the policy function.

7. The method of claim 6, wherein the first information o is sent by the AF to apply a policy for the background data transfer to an existing session.

8. The method of claim 6, wherein the first information o further comprises AF session information.

9. The method of claim 6, wherein a session is established by the UE based on the policy information.

10. The method of claim 6, wherein a determination concerning whether user data can be transferred, is performed by the UE based on the policy information.

11. A method performed by a User Equipment (UE), the method comprising:

communicating with an access network node; and receiving a Time Window and a location criteria from a policy function, wherein the Time Window and the location criteria are comprised in policy information for a background data transfer, retrieved by the policy function based on first information provided by an Application Function (AF), and wherein the first information comprises a reference identifier (ID) for the background data transfer.

12. The method of claim 11, wherein the first information is sent by the AF to apply a policy for the background data transfer to an existing session.

13. The method of claim 11, wherein the first information AF further comprises AF session information.

14. The method of claim 11, further comprising establishing a session based on the policy information.

15. The method of claim 11, further comprising making a determination concerning whether user data can be transferred, based on the policy information.

* * * * *